US012682880B2

(12) United States Patent
Liu

(10) Patent No.: US 12,682,880 B2
(45) Date of Patent: Jul. 14, 2026

(54) METHOD AND SYSTEM FOR VEHICLE NOISE REDUCTION, AND VEHICLE EMPLOYING SYSTEM

(71) Applicants:Futaijing Precision Electronics (Yantai) Co., Ltd., Yantai (CN); HON HAI PRECISION INDUSTRY CO., LTD., New Taipei (TW)

(72) Inventor: Ching-Yuan Liu, New Taipei (TW)

(73) Assignees: Futaijing Precision Electronics (Yantai) Co., Ltd., Yantai (CN); HON HAI PRECISION INDUSTRY CO., LTD., New Taipei (TW)

(*) Notice: Subject to any disclaimer, the term of this patent is extended or adjusted under 35 U.S.C. 154(b) by 128 days.

(21) Appl. No.: 18/658,852

(22) Filed: May 8, 2024

(65) Prior Publication Data

US 2025/0166597 A1 May 22, 2025

(30) Foreign Application Priority Data

Nov. 18, 2023 (CN) .......................... 202311550327.1

(51) Int. Cl.
G10K 11/178 (2006.01)
G06V 20/56 (2022.01)

(52) U.S. Cl.
CPC ........ G10K 11/17823 (2018.01); G06V 20/56 (2022.01); G06V 2201/07 (2022.01); G10K 2210/1282 (2013.01)

(58) Field of Classification Search
CPC ..... G10K 11/17823; G10K 2210/1282; G06V 20/56; G06V 2201/07
See application file for complete search history.

(56) References Cited

U.S. PATENT DOCUMENTS

| | | | |
|---|---|---|---|
| 10,643,598 B2* | 5/2020 | Hoggarth | ............ B60R 11/0217 |
| 10,714,116 B2* | 7/2020 | Tintor | ................. G10L 21/0232 |
| 2012/0230504 A1* | 9/2012 | Kuroda | ............ G10K 11/17857 |
| | | | 381/71.4 |
| 2015/0012267 A1* | 1/2015 | Rill | ....................... G10K 11/175 |
| | | | 704/233 |
| 2017/0303037 A1* | 10/2017 | Kobayashi | ............. H04R 3/005 |
| 2018/0077506 A1* | 3/2018 | Wacquant | .............. H04R 3/005 |
| 2018/0151169 A1* | 5/2018 | Kim | ................. G10K 11/17823 |
| 2018/0172510 A1* | 6/2018 | Rosen | .................... G01J 3/0205 |
| 2018/0190258 A1* | 7/2018 | Mohammad | ............ G10L 15/02 |
| 2018/0336913 A1* | 11/2018 | Arndt | ................. G10L 21/0216 |
| 2024/0005904 A1* | 1/2024 | Emiliani | ......... G10K 11/17815 |

FOREIGN PATENT DOCUMENTS

CN          115083384          9/2022

* cited by examiner

*Primary Examiner* — Paul W Huber
(74) *Attorney, Agent, or Firm* — ScienBiziP, P.C.

(57) ABSTRACT

A method for vehicle noise reduction obtains driving environment information of a vehicle and determines a target shelter is presented on at least one side of a driving road of the vehicle based on the driving environment information. First noise waves are collected when the target shelter is presented on the at least one side of the driving road. The first noise waves are driving noise reflected by the target shelter. first noise reduction sound waves are determined based on the first noise waves. The first noise reduction sound waves are a reverse sound waves of the first noise waves. The first noise waves are emitted to an inside of the vehicle. A system for vehicle noise reduction and a vehicle is also provided.

10 Claims, 6 Drawing Sheets

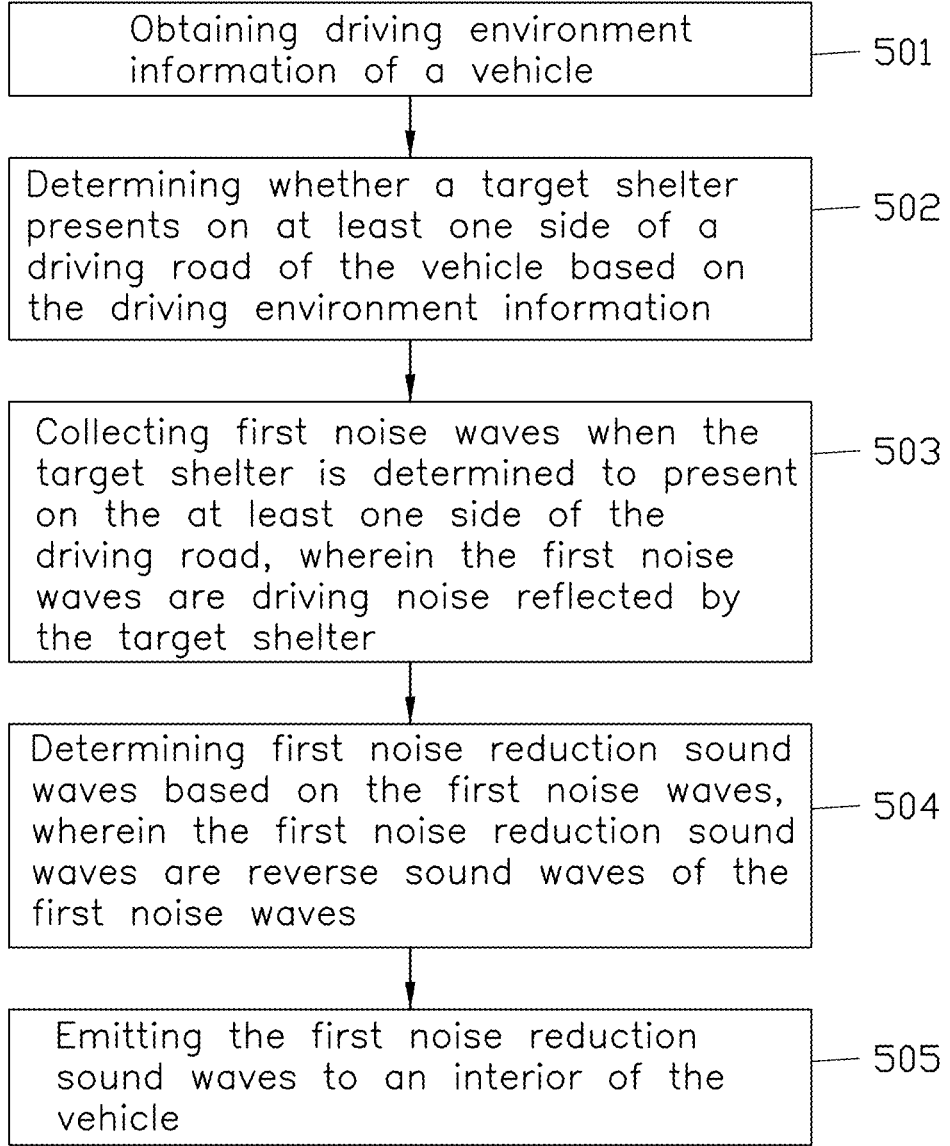

Obtaining driving environment information of a vehicle — 501

Determining whether a target shelter presents on at least one side of a driving road of the vehicle based on the driving environment information — 502

Collecting first noise waves when the target shelter is determined to present on the at least one side of the driving road, wherein the first noise waves are driving noise reflected by the target shelter — 503

Determining first noise reduction sound waves based on the first noise waves, wherein the first noise reduction sound waves are reverse sound waves of the first noise waves — 504

Emitting the first noise reduction sound waves to an interior of the vehicle — 505

FIG. 5

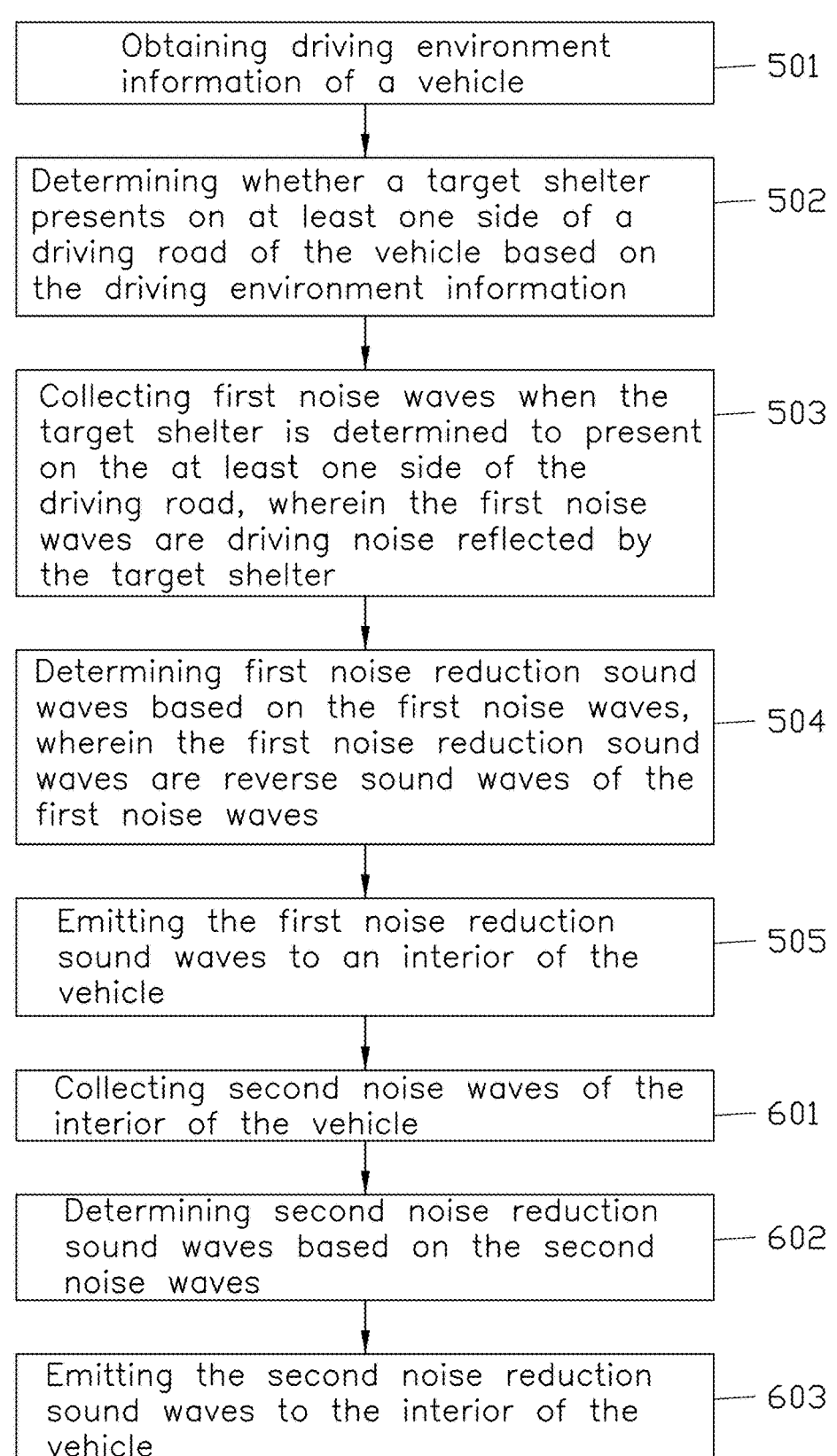

Obtaining driving environment information of a vehicle — 501

Determining whether a target shelter presents on at least one side of a driving road of the vehicle based on the driving environment information — 502

Collecting first noise waves when the target shelter is determined to present on the at least one side of the driving road, wherein the first noise waves are driving noise reflected by the target shelter — 503

Determining first noise reduction sound waves based on the first noise waves, wherein the first noise reduction sound waves are reverse sound waves of the first noise waves — 504

Emitting the first noise reduction sound waves to an interior of the vehicle — 505

Collecting second noise waves of the interior of the vehicle — 601

Determining second noise reduction sound waves based on the second noise waves — 602

Emitting the second noise reduction sound waves to the interior of the vehicle — 603

FIG. 6

METHOD AND SYSTEM FOR VEHICLE NOISE REDUCTION, AND VEHICLE EMPLOYING SYSTEM

TECHNICAL FIELD

The subject matter herein generally relates to vehicle noise reduction.

BACKGROUND

Vehicles mainly use sound insulation materials with characteristics of vibration isolation, sound insulation, noise reduction, and sound absorption to realize noise reduction. The basic principle is to use the mechanical interaction between sound waves and the sound insulation materials, so that sound energy can be converted into other forms of energy to reduce noise.

However, in the process of driving, the vehicle can produce a great deal of driving noise, such as wind cut noise and road noise outside the car. When the driving noise is reflected, it will penetrate the window or pass from the door gap to the inside of the vehicle, resulting in greater internal noise of the vehicle. The above sound insulation materials may not reduce noises from the above described sources.

BRIEF DESCRIPTION OF THE DRAWINGS

Implementations of the present technology will now be described, by way of example only, with reference to the attached figures.

FIG. 5 is a flowchart of a method for vehicle noise reduction in one embodiment of the present application.

FIG. 6 is a flowchart of a method for vehicle noise reduction in another embodiment of the present application.

DETAILED DESCRIPTION

Figure 1:
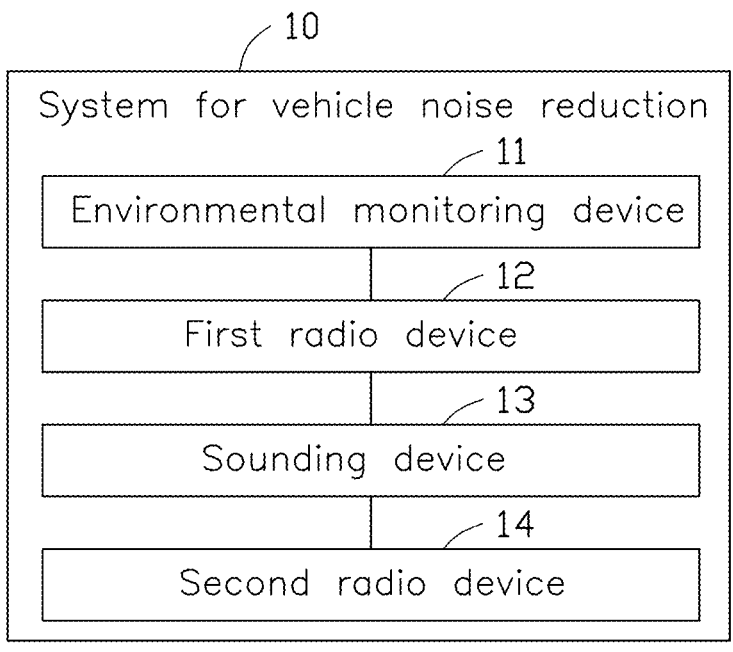
FIG. 1 is a structure diagram of a system for vehicle noise reduction in one embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the targets are permanently connected or releasably connected. The term "comprising," when utilized, means "including, but not necessarily limited to"; it specifically indicates open-ended inclusion or membership in the so-described combination, group, series, and the like.

During a driving process, a vehicle may produce a great deal of driving noise, such as wind cut noise and road noise outside the vehicle. When the driving noise is reflected, the driving noise can penetrate windows or pass door gaps into the inside of the vehicle.

For example, when the vehicle is near shelters, such as barriers or fences during the driving process, the driving noise will be reflected by the barriers or fences, and the reflected driving noise is easy to be transmitted to the inside of the vehicle, resulting in greater noise inside the vehicle.

Figure 2:
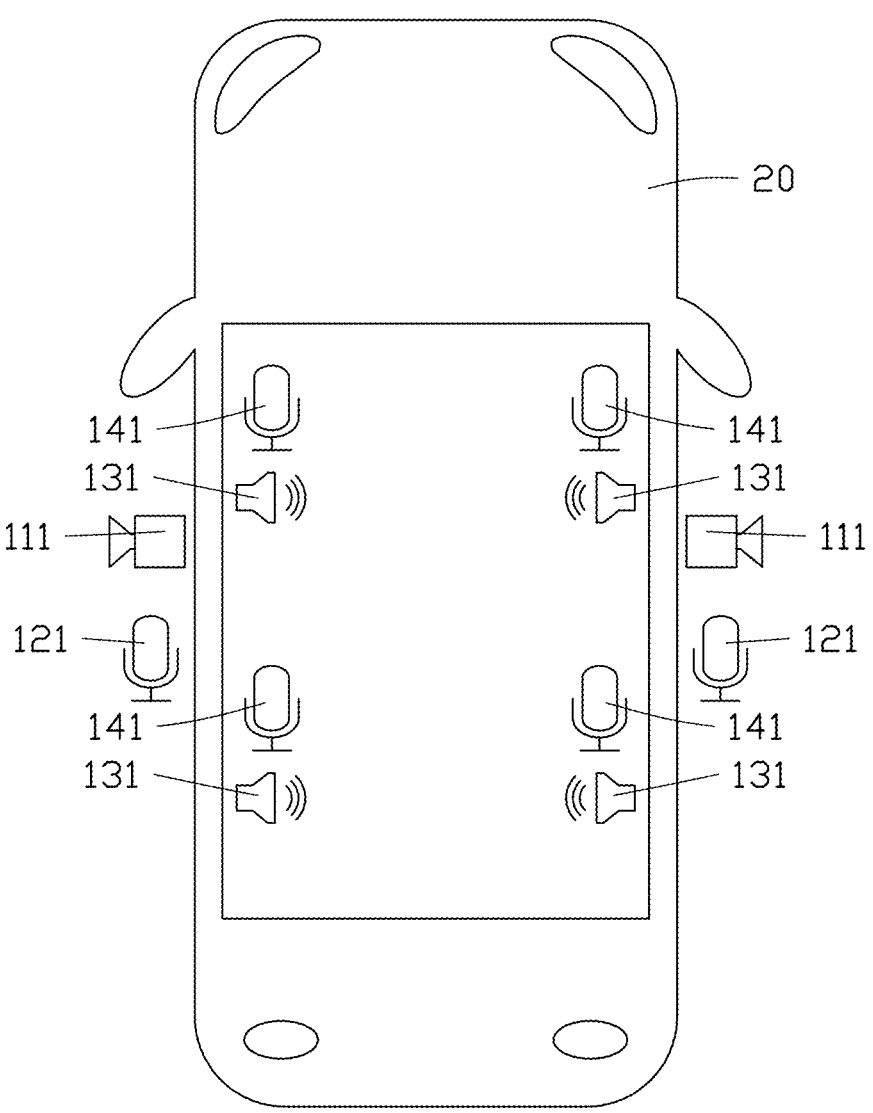
FIG. 2 is a structure diagram of a vehicle in one embodiment of the present application.

FIG. 1 is a structure diagram of a system for vehicle noise reduction (system 10) in one embodiment of the present application. The system 10 can be set in a vehicle 20 as shown in FIG. 2. The system 10 can reduce the noise reflected by the shelters to the inside of the vehicle 20 and improve the comfort level of the vehicle 20.

The system 10 includes an environmental monitoring device 11, a first radio device 12, and a sound device 13.

For the sake of explanation, the structural diagrams of the system 10 and vehicle 20 only show the parts related to the embodiments of this application, and those skilled in the art can understand that the illustrated structure does not constitute the limitation of the system 10. The system 10 and the vehicle 20 can include more or fewer components (such as computer equipment such as controllers) than indicated, or combine certain components, or have different parts arranged.

The environmental monitoring device 11 is arranged on the vehicle 20. The environmental monitoring device 11 is configured to obtain the driving environment information of the vehicle 20, and determine whether a target shelter 30 is presented on at least one side of a driving road of the vehicle 20 based on the driving environment information.

The driving environment information can indicate whether the target shelter 30 is presented on the sides of the driving road of vehicle 20. For example, the driving environment information can include image data that shows at least one side of the road where the vehicle 20 is traveling and the target shelter 30 is presented on a side of the road.

Figure 3:
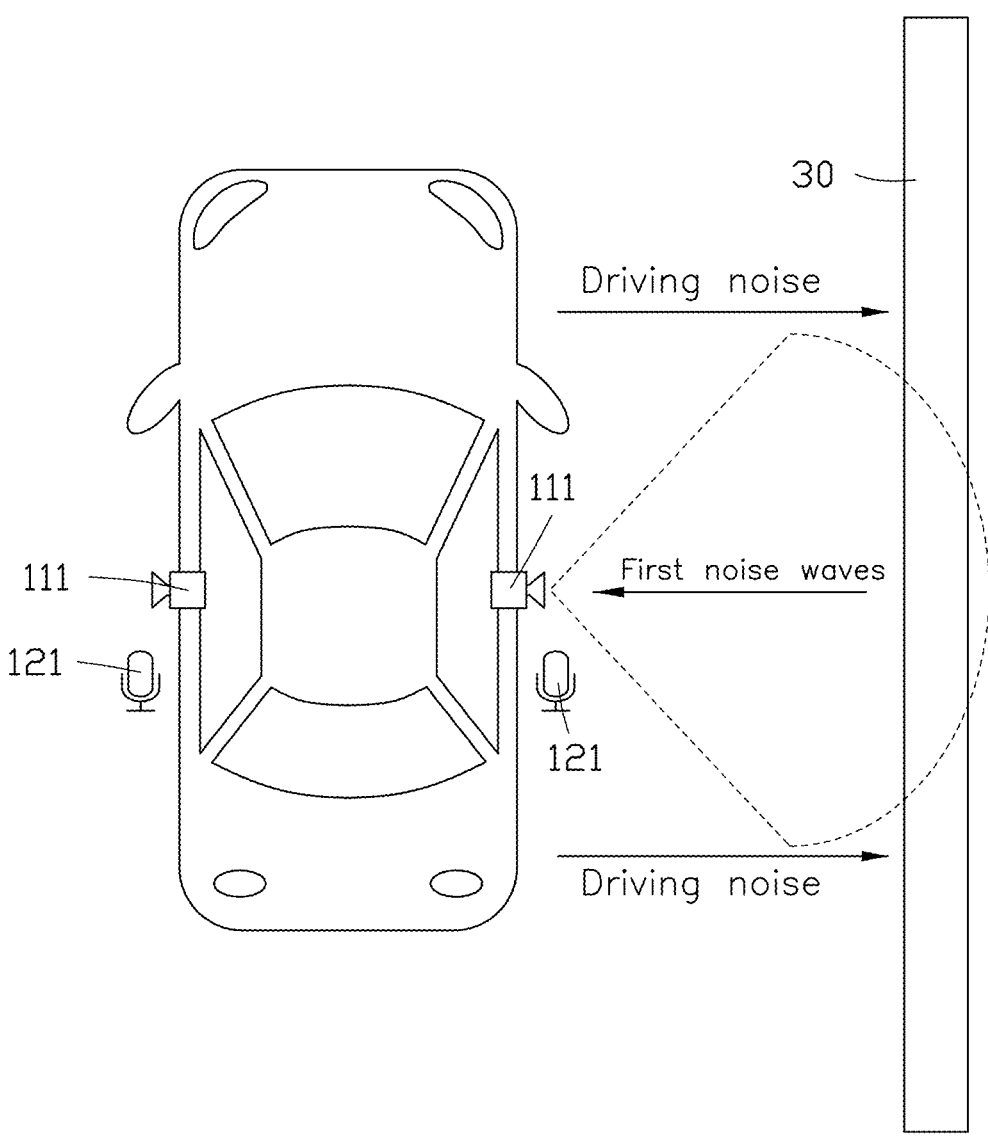
FIG. 3 is a scene diagram of a target shelter reflecting driving noise in one embodiment of the present application.

As shown in FIG. 3, the target shelters 30 can be barriers of roadside fence, guardrails, walls, tunnel side walls, etc., which can reflect the driving noise.

In one embodiment, as shown in FIG. 2 and FIG. 3, the environmental monitoring device 11 comprises a camera 111 arranged at the outside of the vehicle 20. The camera 111 is configured to capture the driving environment of the vehicle 20. The environmental monitoring device 11 is configured to determine whether the target shelter 30 is presented on at least one side of the road of the vehicle based on the image data.

In one embodiment, the environmental monitoring device 11 can further include an image recognition module. The camera 111 can transmit the captured image data to the image recognition module.

In one embodiment, the image recognition module can be a programmable software instruction stored in memory and can be called and executed by the processor. It is understood that, in other embodiments, the image recognition module can also be a program instruction or firmware that is solidified in the processor.

The image recognition module can be configured to determine whether the target shelter 30 is presented on at least one side of the driving road of the vehicle 20 based on the image data.

For example, the image recognition module can input the image data into a pre-trained image classification model to obtain the category of the image data. The category of the image data is that at least one side of the driving road of the vehicle 20 shown in the image data has a target shelter 30, or at least one side of the driving road of the vehicle 20 shown in the image data does not have a target shelter 30.

For example, the image recognition module can input the image data into a pre-trained target detection model, which is configured to detect the target shelter 30 based on the image data.

The above methods for detecting the target shelter 30 in image data is only examples, which can be set according to the requirements in the actual application process, and is not limited in this application embodiment.

In one embodiment, when the environmental monitoring device 11 detects that the target shelter 30 is presented on at least one side of the driving road of vehicle 20, the detection result can be transmitted to the first radio device 12, so that the first radio device 12 can respond to the detection result and begin to collect the driving noise reflected by the target shelter 30 (i.e. the first noise wave).

The first radio device 12 is arranged at an outside of the vehicle. The first radio device 12 is communicated with the environmental monitoring device 11. The first radio device 12 is configured to collect first noise waves when the target shelter is presented on at least one side of the driving road of the vehicle 20.

In one embodiment, as shown in FIG. 2 and FIG. 3, the first radio device 12 may include a first microphone 121 positioned outside the vehicle 20, mounted on the side of the vehicle 20, so as to collect the driving noise reflected by the target shelter 30 located on the side of the driving road.

The first radio device 12 begins to collect noise waves when the target shelter 30 is presented on at least one side of the driving road of the vehicle 20, so as to reduce the noise based on the noise waves. Thus the noise reduction effect of the vehicle 20 can be ensured and the noise reduction energy consumption of the vehicle 20 can be reduced.

In one embodiment, when the environmental monitoring device 11 detects that at least one side of the road of the vehicle 20 has the target shelter 30, the environmental monitoring device 11 can further detect whether the vehicle 20 currently meets the preset condition of opening noise reduction mode. If the vehicle 20 meets the preset condition, it indicates that the first noise waves are large. The environmental monitoring device 11 can control the first radio device 12 to start collecting the first noise waves, so that the system 10 can reduce the noise for the first noise waves.

The system 10 may begin to collect the first noise waves after the vehicle 20 meets the preset condition, so that the system 10 can reduce the noise based on the first noise waves, and further reduce the energy consumption of the vehicle 20 while ensuring the passenger's riding experience.

In one embodiment, the preset condition of opening noise reduction mode comprises: the distance between the target shelter 30 and the vehicle 20 is within a preset distance range. The preset distance range can be set according to the actual application requirements, which is not limited by this application embodiments. The distance between the target shelter 30 and the vehicle 20 can be calculated on the basis of the image data or determined in other ways, which are not limited by this application embodiments.

The greater the distance between the target shelter 30 and the vehicle 20, the smaller the driving noise reflected by the target shelter 30. The smaller the distance between the target shelter 30 and the vehicle 20, the greater the driving noise reflected by the target shelter 30. When the distance between target shelter 30 and vehicle 20 is within the preset distance range, the system 10 can carry out noise reduction for the first noise waves, saving the energy consumption caused by noise reduction and ensuring the noise reduction effect of the vehicle 20.

In one embodiment, the preset condition of opening noise reduction mode comprises: a current driving speed of the vehicle 20 is exceeding the preset driving speed.

The greater the driving speed, the greater the driving noise reflected by the target shelter 30. The system 10 carries out noise reduction for the first noise waves when the current driving speed of the vehicle 20 exceeds the preset driving speed, which can further save the energy consumption caused by noise reduction and ensure the noise reduction effect of the vehicle 20.

In one embodiment, the preset condition of opening noise reduction mode comprises: the distance between the target shelter 30 and the vehicle 20 is within a preset distance range, and a current driving speed of the vehicle 20 is exceeding the preset driving speed.

In one embodiment, the system 10 can also determine the preset condition of opening noise reduction mode based on the energy surplus of the vehicle 20 (such as the battery surplus of the vehicle 20).

For example, if the battery surplus is within the first range, the noise reduction mode can be opened when the target shelter 30 is detected, the first noise waves can be collected to start noise reduction.

If the battery surplus is within the second range, the noise reduction mode can be opened when the current driving speed of the vehicle 20 exceeds the preset driving speed, or the distance between the target shelter 30 and the vehicle 20 is within the preset distance range.

If the battery surplus is within the third range, the noise reduction mode can be opened when the current driving speed of the vehicle 20 exceeds the preset driving speed, and the distance between the target shelter 30 and the vehicle 20 is within the preset distance range.

Among them, a value relationship may be: the battery surplus described in the first range>the battery surplus described in the second range>the battery surplus described in the third range.

The values of the first range, the values of the second range, and the values of the third range can be set according to the actual application requirements, and are not limited in this application embodiments.

After collecting the driving noise reflected by the target shelter 30, the driving noise can be converted into electrical signals and the electrical signals can be transmitted to the sound device 13.

In one embodiment, the sound device 13 is arranged at an inside of the vehicle 20. The sound device 13 has a communication connection with the first radio device 12. The sound device 13 is configured to determine the first noise reduction sound waves based on the first noise waves. The first noise reduction sound waves are the reverse sound waves of the first noise waves. The sound device 13 is further configured to emit the first noise reduction sound waves to the inside of the vehicle 20.

The phase of the first noise reduction sound waves is opposite to the phase of the first noise waves (i.e., the phase difference of the first noise reduction sound waves and the first noise waves is 180 degrees), and the frequency of the first noise reduction sound waves and the frequency of the first noise waves are the same.

In one embodiment, the sound device 13 comprises at least one speaker 131 arranged in the inside of the vehicle 20. The speaker 131 near the target shelter 30 is configured to emit the first noise reduction sound waves to the inside of the vehicle 20. The speaker 131 can emit the first noise reduction sound waves towards passengers in the cockpit directly to improve the passengers experience.

The sound device 13 can further include a noise process module. The noise process module can be a programmable software instruction stored in memory and can be called and executed by the processor, or it can be a program instruction or firmware solidified in the processor.

The noise process module can be configured to generate electrical signals corresponding to the reverse sound waves of the first noise waves (the first noise reduction sound waves) and transmit the electrical signals to the speaker 131. The electrical signals can control the speaker 131 to emit the first noise reduction sound waves.

The speaker 131 on the side of the sound device 13 near the target shelter 30 is configured to emit the first noise reduction sound waves to the inside the vehicle 20 based on the first noise waves.

Since the first noise waves are preferentially transmitted to the cockpit on the side near the target shelter 30, by emitting the first noise waves from the speaker 131 near the side of the target shelter 30, the noise reduction efficiency and the noise reduction effect can be improved.

Figure 4:
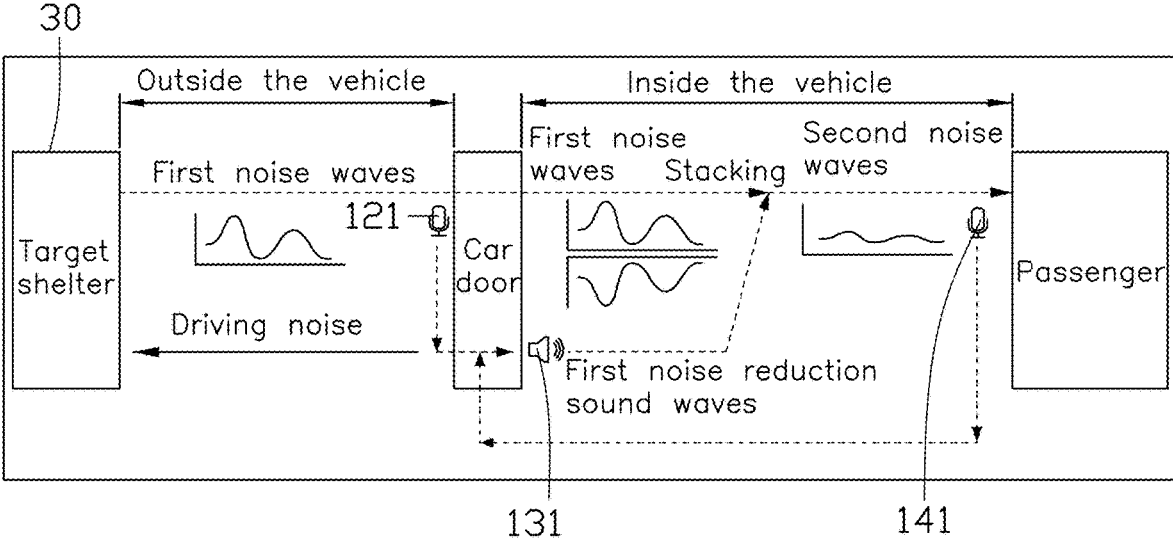
FIG. 4 is a scene diagram of noise reduction in one embodiment of the present application.

In one embodiment, the system 10 further comprises a second radio device 14. The second radio device 14 is arranged at the inside of the vehicle 20. The second radio device 14 is communicated with the sound device 13. The second radio device 14 is configured to collect second noise waves inside the vehicle 20 after the sound device 13 emitting the first noise reduction sound waves. The sound device 13 is also configured to determine second noise reduction sound waves based on the second noise waves, and emit the second noise reduction sound waves into the inside of the vehicle 20. As shown in FIG. 4, the second noise waves are formed by superposition of the first noise waves and the first noise reduction sound waves.

In one embodiment, the second radio device 14 can include at least one second microphone 141 arranged in the cockpit of the vehicle 20. The second microphone 141 is configured to collect the second noise waves.

In one embodiment, the second radio device 14 can further include a noise reduction optimization module. The noise reduction optimization module can be a programmable software instruction stored in memory and can be called and executed by the processor, or it can be a program instruction or firmware solidified in the processor. The noise reduction optimization module is configured to determine the noise reduction effect based on the second noise sound waves.

For example, the noise reduction optimization module can be configured to detect whether the value of the second noise sound waves is less than the preset noise standard value. When the value of the second noise sound waves is less than the preset noise standard value, it means that the noise inside the vehicle 20 is up to standard and the noise reduction effect is good. When the value of the second noise sound waves is greater than the preset noise standard value, it means that the vehicle noise is not up to standard. The noise reduction effect can be determined according to the difference between the second noise sound waves and the noise standard value. The greater the difference, the worse the noise reduction effect.

The noise reduction optimization module can also determine whether to transmit the electrical signals corresponding to the second noise reduction waves to the sound device 13 according to the noise reduction effect.

For example, if the noise in the vehicle 20 is not up to standard, the second noise reduction sound waves are transmitted to the corresponding electrical signals to the sound device 13.

The sound device 13 is further configured to determine the second noise reduction sound waves based on the second noise waves. The second noise reduction sound waves are emitted inside the vehicle 20 so that the system 10 can further optimize the noise reduction for the second noise waves.

For example, the noise process module of the sound device 13 can also be configured to obtain the electrical signals corresponding to the second noise reduction sound waves based on the second noise waves, and transmit the electrical signals corresponding to the second noise waves to the speaker 131. The electrical signals can control the speaker 131 to emit second noise reduction waves towards the inside of the vehicle 20.

In one embodiment, determining of the second noise reduction sound waves based on the second noise waved can include: obtaining the first noise waves collected from the first radio device 12, superimposing the first noise waves and the second noise waves collected to obtain the superimposed noise waves. The inverse sound waves of the superimposed noise waves are taken as the second noise reduction sound waves.

For example, the first noise waves collected last time is denoted as t. The second noise waves inside vehicle 20 is obtained after the noise reduction of the first noise reduction sound waves for the first noise waves t. The first noise waves collected currently is denoted as t+1. The first noise waves collected currently t+1 and the second noise waves are superimposed to form the superimposed noise waves. The inverse sound waves of the superimposed noise waves are taken as the second noise reduction sound waves.

The system 10 can monitor and optimize the noise reduction, so as to further improve the noise reduction effect inside the vehicle 20.

When the vehicle 20 is driving next to target shelter 30, the driving noise reflected by target shelter 30 (that is, the first noise waves) can be collected and the reverse sound waves of the first noise waves can be output inside vehicle 20, so that the first noise reduction sound waves transmitted inside vehicle 20 can be superimposed with the reverse sound waves, thus reducing the noise waves reflected inside vehicle 20 by target shelter 30 during the driving process. Comparing to noise reduction by sound insulation materials, the system 10 can suppress noise with high penetration rate and improve riding comfort of the vehicle 20.

A method for vehicle noise reduction is also provided. The method can be applied to the system 10 shown in FIG. 1. The details of the system 10 in this embodiment are substantially the same as those in the above embodiments. The system 10 can be applied to the vehicle 20, including cars, sports cars, trucks, etc.

FIG. 5 illustrates one exemplary embodiment of the method vehicle noise reduction. The flowchart presents an exemplary embodiment of the method. The exemplary method is provided by way of example, as there are a variety of ways to carry out the method. Each block shown in FIG.

5 may represent one or more processes, methods, or sub-routines, carried out in the example method. Furthermore, the illustrated order of blocks is illustrative only and the order of the blocks can change. Additional blocks can be added or fewer blocks may be utilized, without departing from this disclosure. The example method can begin at block S501.

In block S501, driving environment information of the vehicle 20 is obtained.

The driving environment information can reflect whether there is a target shelter 30 on the side of the driving road of the vehicle 20. The driving environment information can comprise image data. The image data shows the side picture of the road where vehicle 20 is driving.

In one embodiment, as shown in FIG. 2 and FIG. 3, the system 10 comprises a camera 111 arranged at the outside of the vehicle 20. The camera 111 is configured to capture the driving environment of the vehicle 20 to obtain the image data.

In block S502, a target shelter is determined to be presented or not on at least one side of a driving road of the vehicle based on the driving environment information.

The target shelters 30 can be the barriers of roadside fence, guardrails, walls, tunnel side walls, etc., which can reflect the driving noise.

In one embodiment, the target shelter 30 can be determined to be presented or not on the at least one side of the driving road of the vehicle based on the image data.

For example, the system 10 inputs the image data into a pre-trained image classification model to obtain the category of the image data. The category of the image data can be that at least one side of the driving road of the vehicle 20 shown in the image data presents the target shelter 30, or at least one side of the driving road of the vehicle 20 shown in the image data does not present the target shelter 30.

For another example, the system 10 inputs the image data into a pre-trained target detection model, which is configured to detect the target shelter 30 based on the image data.

The above method of detecting target shelter 30 in image data is only for example, which can be set according to the requirements in the actual application process, and is no limited in this application embodiments.

In block S503, a first noise wave is collected when the target shelter is presented on the at least one side of the driving road. The first noise waves are driving noise reflected by the target shelter.

The system 10 can collect the first noise waves on the outside of the vehicle 20, which is the side of the vehicle 20 near the target shelter 30.

In one embodiment, as shown in FIG. 2 and FIG. 3, the system 10 can include a first microphone 121 positioned outside the vehicle 20, mounted on the side of the vehicle 20, so as to collect the driving noise reflected by the target shelter 30 located on the side of the driving road.

In one embodiment, if there is a target shelter 30 on at least one side of the driving road, detecting whether the vehicle 20 currently meets the preset condition of opening noise reduction mode. If the vehicle 20 meets the preset condition, it indicates that the first noise waves are large, the system 10 collects the first noise wave, so that the system 10 can reduce the noise for the first noise waves.

In one embodiment, the preset condition of opening noise reduction mode comprises: the distance between the target shelter 30 and the vehicle 20 is within a preset distance range. The preset distance range can be set according to the actual application requirements, which is not limited by this application embodiments. The distance between the target shelter 30 and the vehicle 20 can be calculated on the basis of the image data or determined in other ways, which are not limited by this application embodiments.

The greater the distance between the target shelter 30 and the vehicle 20, the smaller the driving noise reflected by the target shelter 30. The smaller the distance between the target shelter 30 and the vehicle 20, the greater the driving noise reflected by the target shelter 30. When the distance between target shelter 30 and vehicle 20 is within the preset distance range, the system 10 can carry out noise reduction for the first noise waves. Thus saving the energy consumption caused by noise reduction and ensure the noise reduction effect of the vehicle 20.

In one embodiment, the preset condition of opening noise reduction mode comprises: a current driving speed of the vehicle 20 is exceeding the preset driving speed.

The greater the driving speed, the greater the driving noise reflected by the target shelter 30. The system 10 carries out noise reduction for the first noise waves when the current driving speed of the vehicle 20 exceeds the preset driving speed, which can further save the energy consumption caused by noise reduction and ensure the noise reduction effect of the vehicle 20.

In one embodiment, the preset condition of opening noise reduction mode comprises: the distance between the target shelter 30 and the vehicle 20 is within a preset distance range, and a current driving speed of the vehicle 20 is exceeding the preset driving speed.

In one embodiment, the system 10 can also determine the preset condition of opening noise reduction mode based on the energy surplus of the vehicle 20 (such as the battery surplus of the vehicle 20).

For example, if the battery surplus is within the first range, the noise reduction mode can be opened when the target shelter 30 is detected, that is, the first noise waves are collected to start noise reduction.

If the battery surplus is within the second range, the noise reduction mode can be opened when the current driving speed of the vehicle 20 exceeds the preset driving speed, or the distance between the target shelter 30 and the vehicle 20 is within the preset distance range.

If the battery surplus is within the third range, the noise reduction mode can be opened when the current driving speed of the vehicle 20 exceeds the preset driving speed, and the distance between the target shelter 30 and the vehicle 20 is within the preset distance range.

Among them, the battery surplus described in the first range>the battery surplus described in the second range>the battery surplus described in the third range.

The values of the first range, the values of the second range, and the values of the third range can be set according to the actual application requirements, and are not limited in this application embodiments.

In block 504, first noise reduction sound waves are determine based on the first noise waves. The first noise reduction sound waves are a reverse sound waves of the first noise waves. The phase of the first noise reduction sound waves is opposite to the phase of the first noise waves (i.e., the phase difference of the first noise reduction sound waves and the first noise waves is 180 degrees), and the frequency of the first noise reduction sound waves and the frequency of the first noise waves are the same.

In block 505, the first noise reduction sound waves are emitted to an inside of the vehicle.

In one embodiment, the system 10 comprises at least one speaker 131 arranged in the inside of the vehicle 20. The speaker 131 near the target shelter 30 is configured to emit the first noise reduction sound waves to the inside of the vehicle 20. The speaker 131 can emit the first noise reduction sound waves towards passengers in the cockpit directly to improve the passengers experience.

The system 10 can control the speaker 131 on the side of the sound device 13 near the target shelter 30 to emit the first noise reduction sound waves to the inside the vehicle 20 based on the first noise waves.

Since the first noise waves are preferentially transmitted to the cockpit on the side near the target shelter 30, by emitting the first noise waves from the speaker 131 near the side of the target shelter 30, the noise reduction efficiency and the noise reduction effect can be improved.

When the vehicle 20 is driving next to target shelter 30, the driving noise reflected by target shelter 30 (that is, the first noise waves) can be collected and the reverse sound waves of the first noise waves can be output inside vehicle 20, so that the first noise reduction sound waves transmitted inside vehicle 20 can be superimposed with the reverse sound waves, thus reducing the noise waves reflected inside vehicle 20 by target shelter 30 during the driving process. Comparing to noise reduction by sound insulation materials, the system 10 can suppress noise with high penetration rate and improve riding comfort of the vehicle 20.

After the first noise reduction sound waves are emitted inside the vehicle 20, the noise reduction effect can also be monitored and optimized.

FIG. 6 is a flowchart of the method for vehicle noise reduction in another embodiment of the present application In block 601, second noise waves of the inside of the vehicle are collected.

In one embodiment, the system 10 can include at least one second microphone 141 arranged in the cockpit of the vehicle 20. The second microphone 141 is configured to collect the second noise waves.

After collecting the second noise reduction sound waves, the system 10 can also determine the noise reduction effect based on the second noise sound waves.

For example, detecting whether the value of the second noise sound waves are less than the preset noise standard value. When the value of second noise sound waves is less than the preset noise standard value, it means that the noise inside the vehicle 20 is up to standard and the noise reduction effect is good. When the value of the second noise sound waves is greater than the preset noise standard value, it means that the vehicle noise is not up to standard. The noise reduction effect can be determined according to the difference between the second noise sound waves and the noise standard value. The greater the difference, the worse the noise reduction effect.

In block 602, second noise reduction sound waves are determined based on the second noise waves.

In one embodiment, second noise reduction sound waves are determined based on the second noise waves can include: obtaining the first noise waves collected from the first radio device 12, superimposing the first noise waves and the second noise waves collected to obtain the superimposed noise waves, and the inverse sound waves of the superimposed noise waves are taken as the second noise reduction sound waves.

For example, the first noise waves collected last time is denoted as t. The second noise waves inside vehicle 20 is obtained after the noise reduction of the first noise reduction sound waves for the first noise waves t. The first noise waves collected currently is denoted as t+1. The first noise waves collected currently t+1 and the second noise waves are superimposed to form the superimposed noise waves. The inverse sound waves of the superimposed noise waves are taken as the second noise reduction sound waves.

In block 603, the second noise reduction sound waves are emitted to the inside of the vehicle 20.

In one embodiment, the second noise reduction sound waves can be emitted through the speaker 131 installed inside the vehicle 20.

FIG. 2 is a structure diagram of a vehicle 20 in one embodiment of the present application. The vehicle 20 can comprise the system 10.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method of vehicle noise reduction, comprising:
   obtaining driving environment information of a vehicle;
   determining whether a target shelter is present on at least one side of a road the vehicle is on based on the driving environment information;
   collecting first noise waves in response to the target shelter been determined present on the at least one side of the road;
   determining first noise reduction sound waves based on the first noise waves, wherein a phase difference between the first noise reduction sound waves and the first noise waves are configured to be 180 degrees;
   emitting the first noise reduction sound waves to an interior of the vehicle;
   collecting second noise waves of the interior of the vehicle;
   in response to a value of the second noise waves is less than a preset noise standard value, determining noise inside the vehicle satisfies a standard;
   in response to the noise inside the vehicle does not satisfy the standard, determining second noise reduction sound waves based on the second noise waves; and
   emitting the second noise reduction sound waves to the interior of the vehicle.

2. The method of claim 1, wherein collecting the first noise waves comprises:
   detecting whether the vehicle meets a preset condition of opening noise reduction mode;
   collecting the first noise wave when the vehicle meets the preset condition of opening noise reduction mode.

3. The method of claim 2, wherein the preset condition of opening noise reduction mode comprises:
   a distance between the target shelter and the vehicle is within a preset distance range, and a current driving speed of the vehicle is exceeding a preset driving speed.

4. The method of claim 1, wherein the driving environment information comprises image data, a driving environment of the vehicle displayed in the image data, determining whether the target shelter presents on the at least one side of the road of the vehicle based on the driving environment information comprises:

determining whether the target shelter presents on the at least one side of the road of the vehicle based on the image data.

5. A system configured for vehicle noise reduction applied to a vehicle, the system comprising:

an environmental monitoring device configured to be arranged on the vehicle, and configured to obtain driving environment information of the vehicle, and determine whether a target shelter is on at least one side of a road of the vehicle based on the driving environment information;

a first radio device configured to be arranged at an outside of the vehicle and communicated with the environmental monitoring device, the first radio device is configured to collect first noise waves when the target shelter presents on the at least one side of the road, the first noise waves are a driving noise reflected by the target shelter; and a sound device configured to be arranged on an interior of the vehicle and communicated with the first radio device, the sound device is further configured to determine first noise reduction sound waves based on the first noise waves, wherein a phase difference between the first noise reduction sound waves and the first noise waves are configured to be 180 degrees, the sound device is further configured to emit the first reduction sound noise waves to an interior of the vehicle;

a second radio device configured to be arranged on the interior of the vehicle and communicated with the sound device, wherein the second radio device is configured to collect second noise waves inside the vehicle after the sound device emitting the first noise reduction sound waves;

wherein the second radio device further is configured to determine whether a value of the second noise waves is less than a preset noise standard value; in response to the value of the second noise waves is less than the preset noise standard value, the second radio device determines that the noise inside the vehicle satisfies a standard; in response to the second radio device determines the noise inside the vehicle does not satisfy the standard, the sound device is further configured to determine second noise reduction sound waves based on the second noise waves, and emit the second noise reduction sound waves into the interior of the vehicle.

6. The system of claim 5, wherein the driving environment information comprises image data, the driving environment of the vehicle is displayed in the image data;

the environmental monitoring device comprises a camera arranged exterior to the vehicle, the camera is configured to capture the driving environment of the vehicle and obtain the image data, the environmental monitoring device is configured to determine whether the target shelter presents on the at least one side of the driving road of the vehicle based on the image data.

7. The system of claim 5, wherein the sound device comprises at least one speaker arranged in the interior of the vehicle, the at least one speaker is adjacent to the target shelter, and configured to emit the first noise reduction sound waves to the interior of the vehicle.

8. A vehicle, comprising a system configured for vehicle noise reduction, wherein the vehicle comprises:

an environmental monitoring device arranged on the vehicle and configured to obtain driving environment information of the vehicle, and determine whether a target shelter is on at least one side of a road of the vehicle based on the driving environment information;

a first radio device arranged on an exterior of the vehicle and communicating with the environmental monitoring device, and configured to collect first noise waves in response to the environmental monitor determines the target shelter is presented on the at least one side of the driving road, the first noise waves are a driving noise reflected by the target shelter;

a sound device arranged on an interior of the vehicle and communicating with the first radio device, and configured to determine first noise reduction sound waves based on the first noise waves, wherein a phase difference between the first noise reduction sound waves and the first noise waves are configured to be 180 degrees, the sound device is further configured to emit the first reduction sound noise waves to an interior of the vehicle;

a second radio device arranged at the inside of the vehicle and communicating with the sound device, the second radio device is configured to collect second noise waves inside the vehicle in response to the sound device is emitting the first noise reduction sound waves;

wherein the second radio device further is configured to determine whether a value of the second noise waves is less than a preset noise standard value; in response to the value of the second noise waves is less than the preset noise standard value, the second radio device determines that the noise inside the vehicle satisfies a standard; in response to the second radio device determines the noise inside the vehicle does not satisfy the standard, the sound device is further configured to determine second noise reduction sound waves based on the second noise waves, and emit the second noise reduction sound waves into the interior of the vehicle.

9. The vehicle of claim 8, wherein the driving environment information comprises image data, the driving environment of the vehicle is displayed in the image data;

the environmental monitoring device comprises a camera arranged at the outside of the vehicle, the camera is configured to capture the driving environment of the vehicle and obtain the image data, the environmental monitoring device is configured to determine whether the target shelter is presented on the at least one side of the driving road of the vehicle based on the image data.

10. The vehicle of claim 9, wherein the sound device comprises at least one speaker arranged in the interior of the vehicle, the at least one speaker is adjacent to the target shelter, and configured to emit the first noise reduction sound waves to the interior of the vehicle.

\* \* \* \* \*